(12) United States Patent  (10) Patent No.: US 7,914,379 B2
DiDato  (45) Date of Patent: Mar. 29, 2011

(54) VIDEO GAME CONTROLLER

(75) Inventor: Richard C. DiDato, Amawalk, NY (US)

(73) Assignee: Brain Box Concepts, Inc., Amawalk, NY (US)

( * ) Notice: Subject to any disclaimer, the term of this patent is extended or adjusted under 35 U.S.C. 154(b) by 812 days.

(21) Appl. No.: 11/751,112

(22) Filed: May 21, 2007

(65) Prior Publication Data

US 2007/0218995 A1  Sep. 20, 2007

Related U.S. Application Data

(63) Continuation of application No. 11/207,456, filed on Aug. 19, 2005, now Pat. No. 7,235,012.

(60) Provisional application No. 60/603,578, filed on Aug. 23, 2004.

(51) Int. Cl.
*A63F 9/24* (2006.01)
(52) U.S. Cl. .............. 463/37; 463/38; 463/39; 463/40
(58) Field of Classification Search .............. 463/36, 463/37, 38, 40
See application file for complete search history.

(56) References Cited

U.S. PATENT DOCUMENTS

| 6,234,479 | B1 * | 5/2001 | Watanabe et al. ......... 273/148 B |
| 2002/0054018 | A1 * | 5/2002 | Yamaguchi .................. 345/157 |
| 2002/0128063 | A1 | 9/2002 | Kunieda et al. |
| 2004/0032395 | A1 * | 2/2004 | Goldenberg et al. ......... 345/156 |
| 2004/0082382 | A1 * | 4/2004 | Goto et al. ...................... 463/37 |
| 2004/0118669 | A1 * | 6/2004 | Mou .............................. 200/310 |
| 2004/0142749 | A1 * | 7/2004 | Ishimaru et al. ................ 463/37 |
| 2004/0185701 | A1 * | 9/2004 | Yoshie .......................... 439/353 |

FOREIGN PATENT DOCUMENTS

JP  2001 046736  2/2001

* cited by examiner

*Primary Examiner* — Dmitry Suhol
*Assistant Examiner* — Brandon Gray
(74) *Attorney, Agent, or Firm* — Gottlieb, Rackman & Reisman, P.C.

(57) ABSTRACT

A video game includes a controller, a processor and display. The controller includes a special quick look button 28 that, when activated, allows a player to causes a looking movement of a character that simulates the lateral rotation of the head or upper body of a person looking sideways while walking forward.

14 Claims, 15 Drawing Sheets

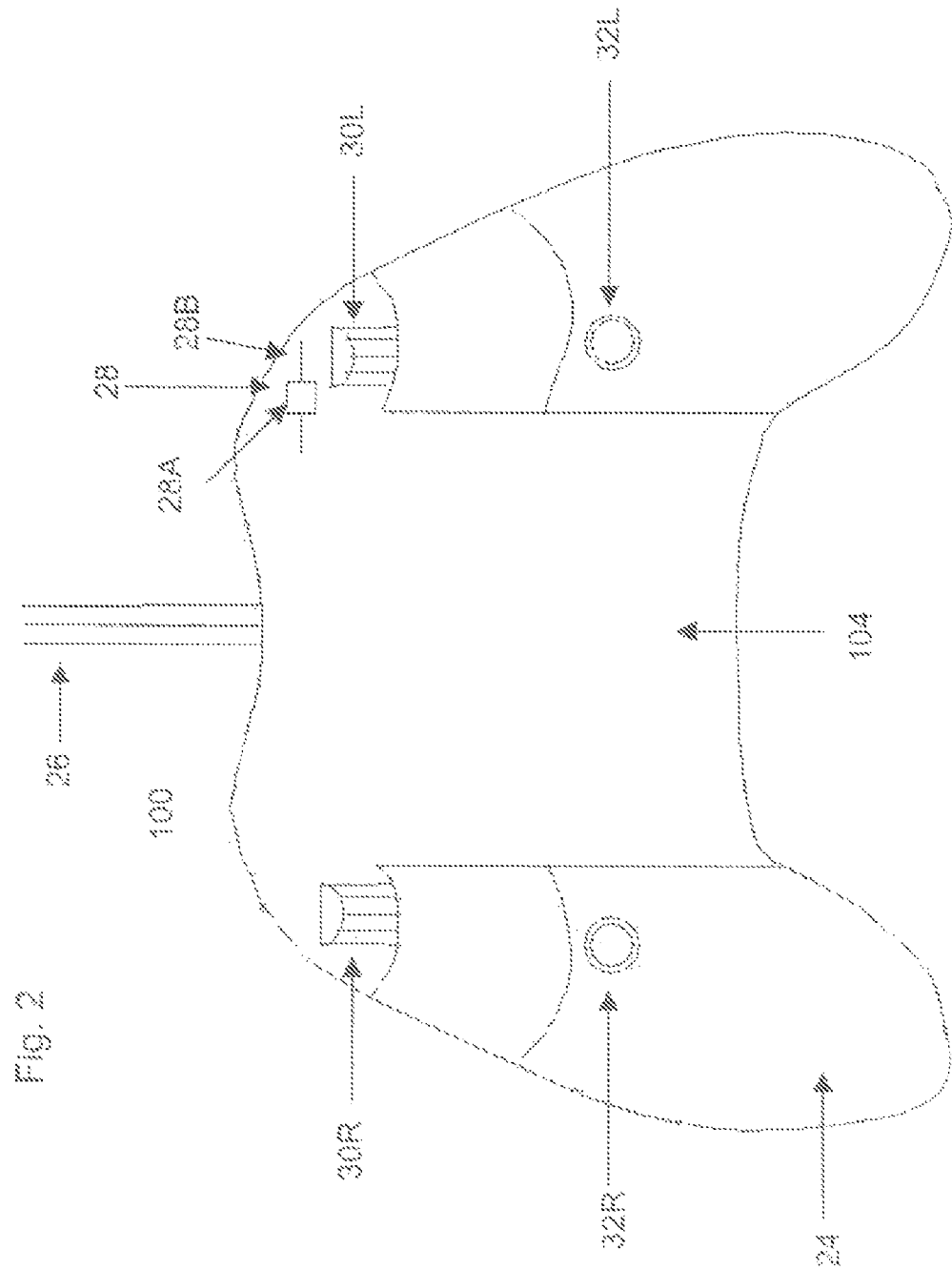

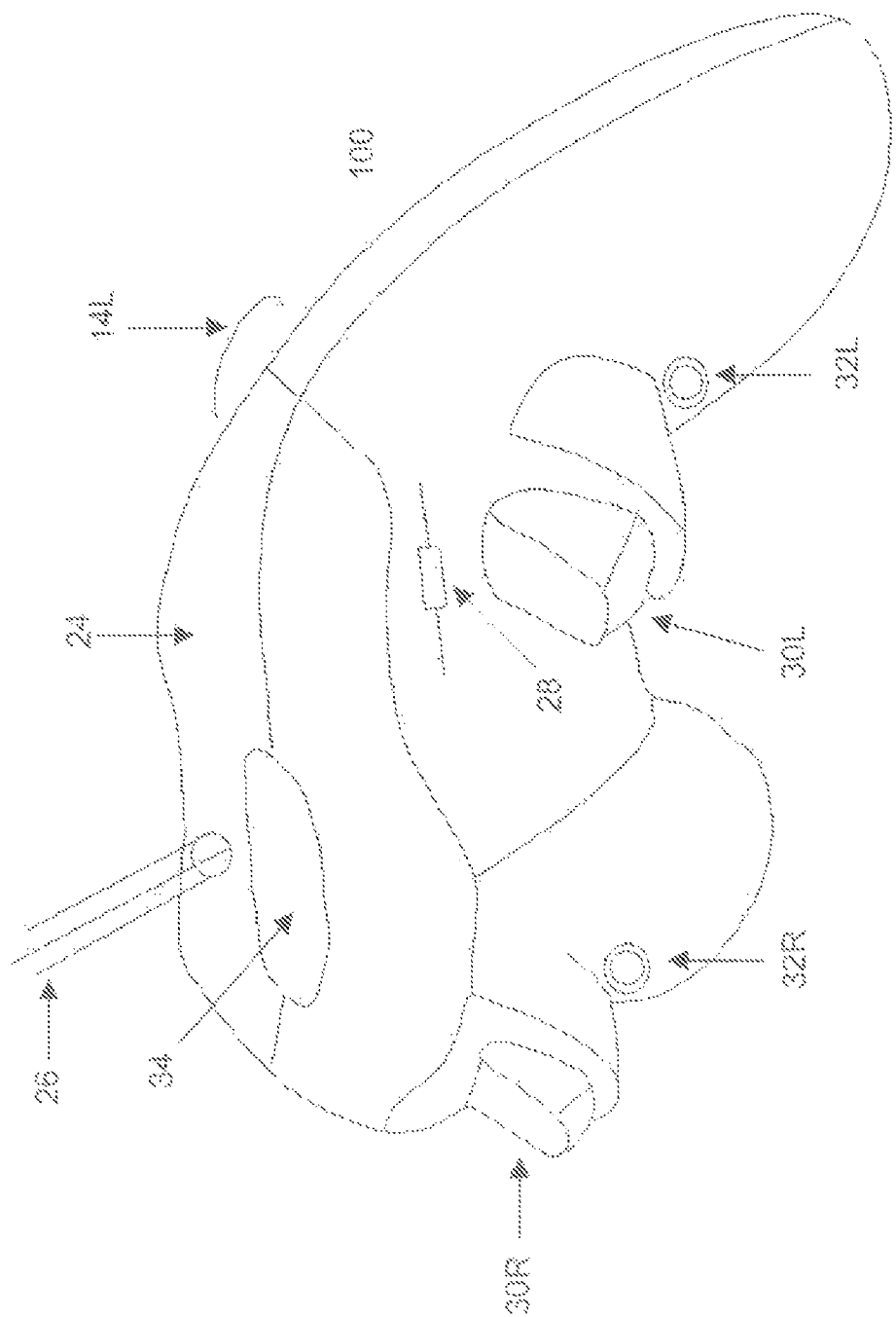

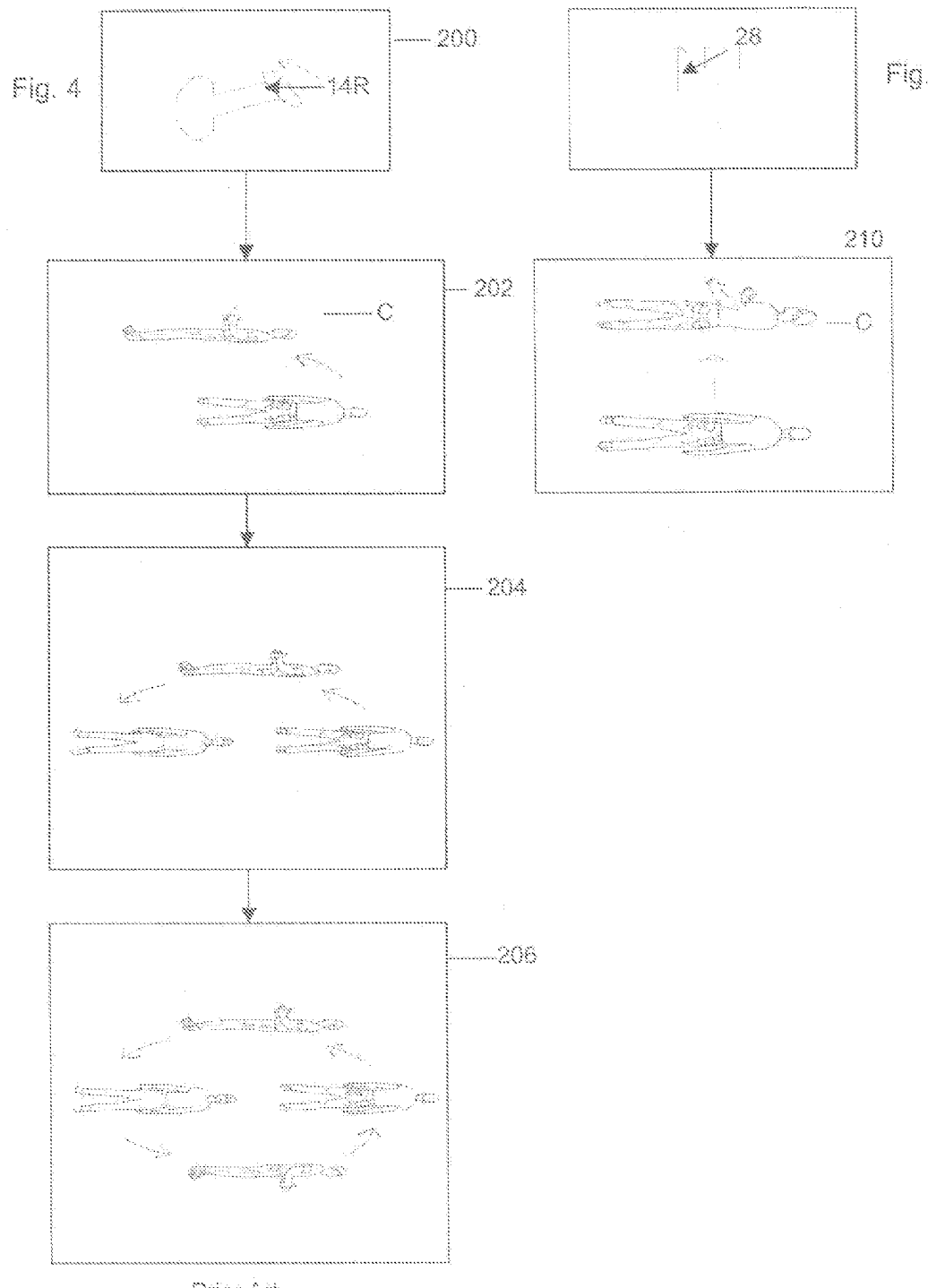

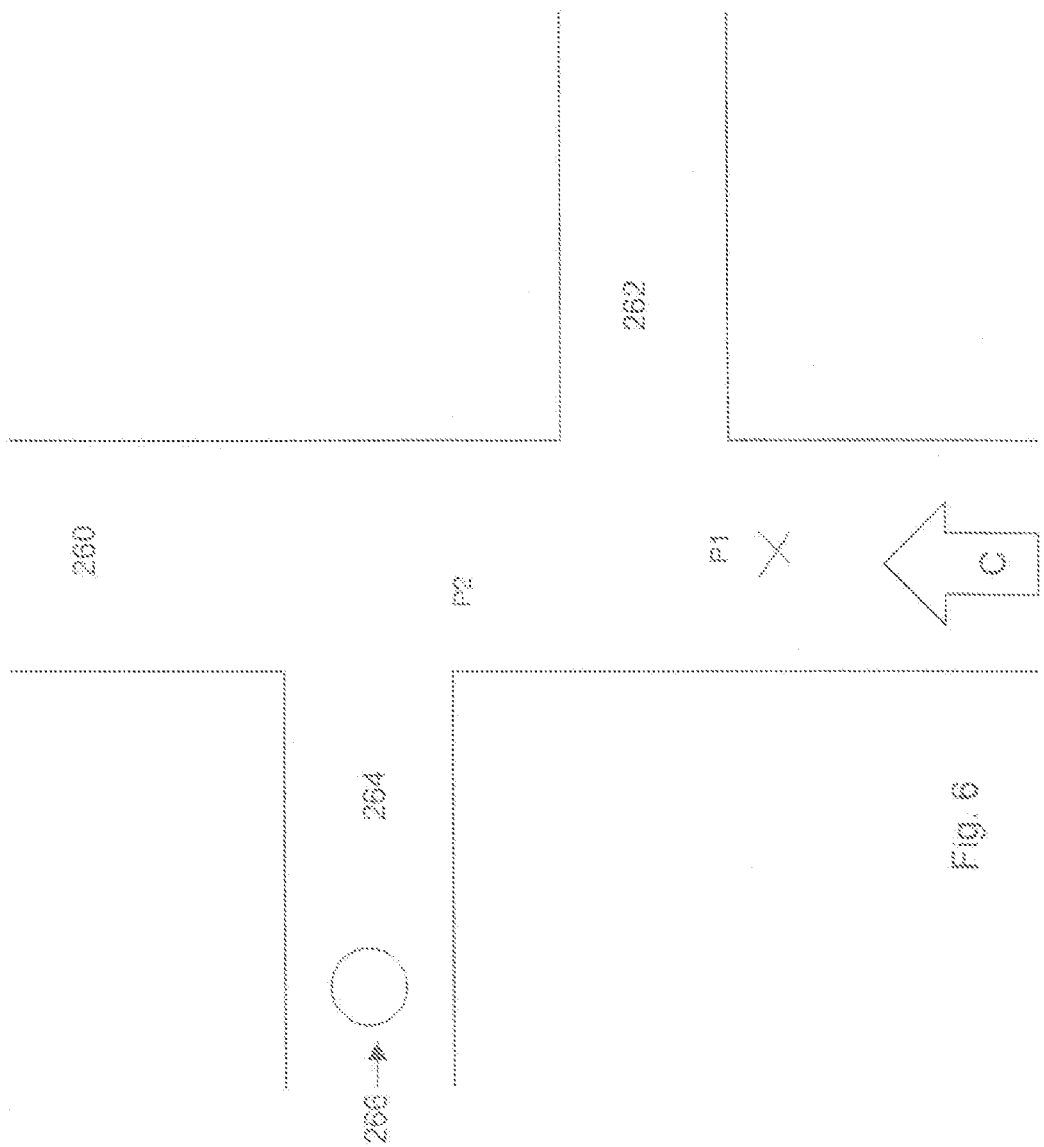

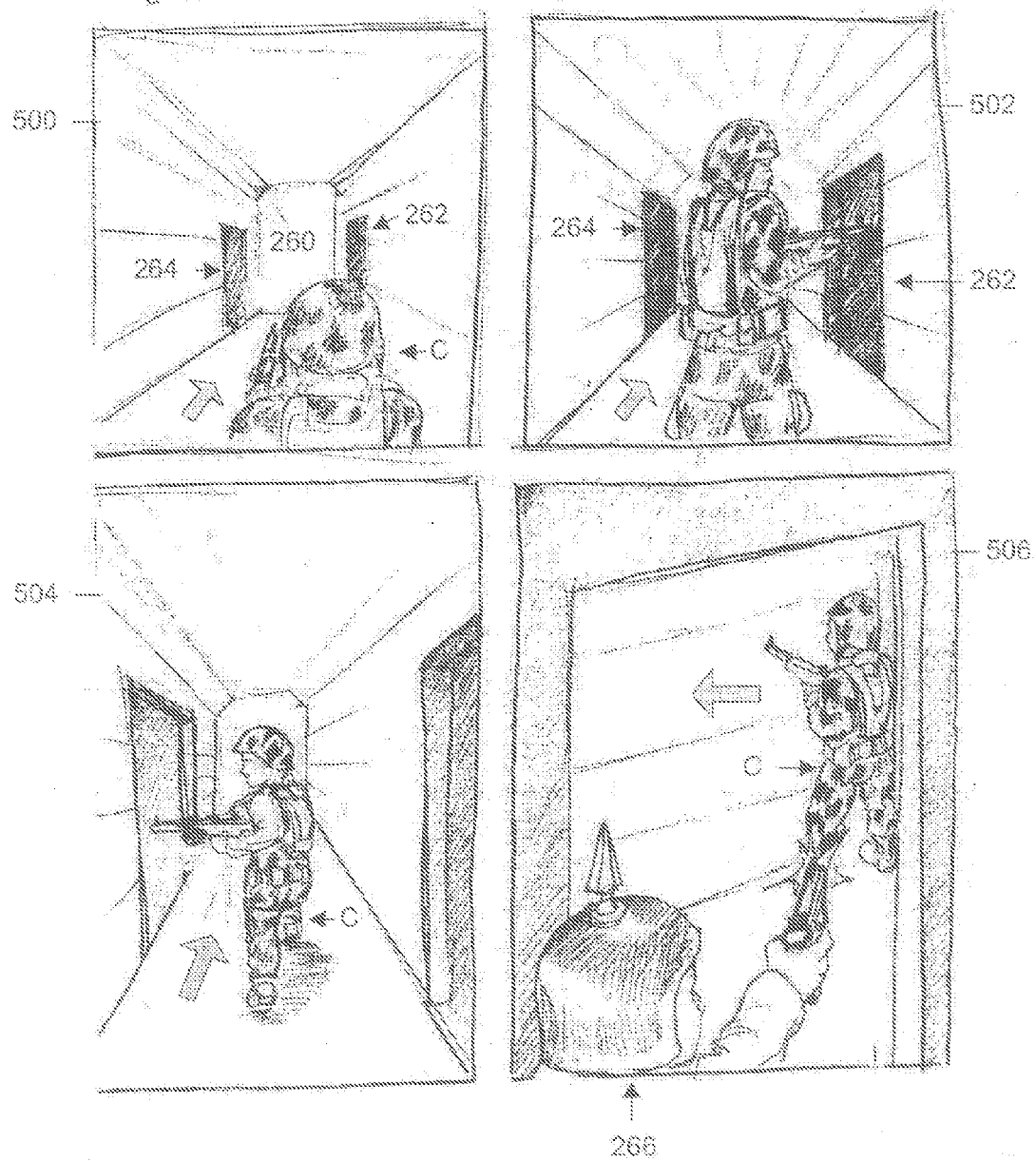

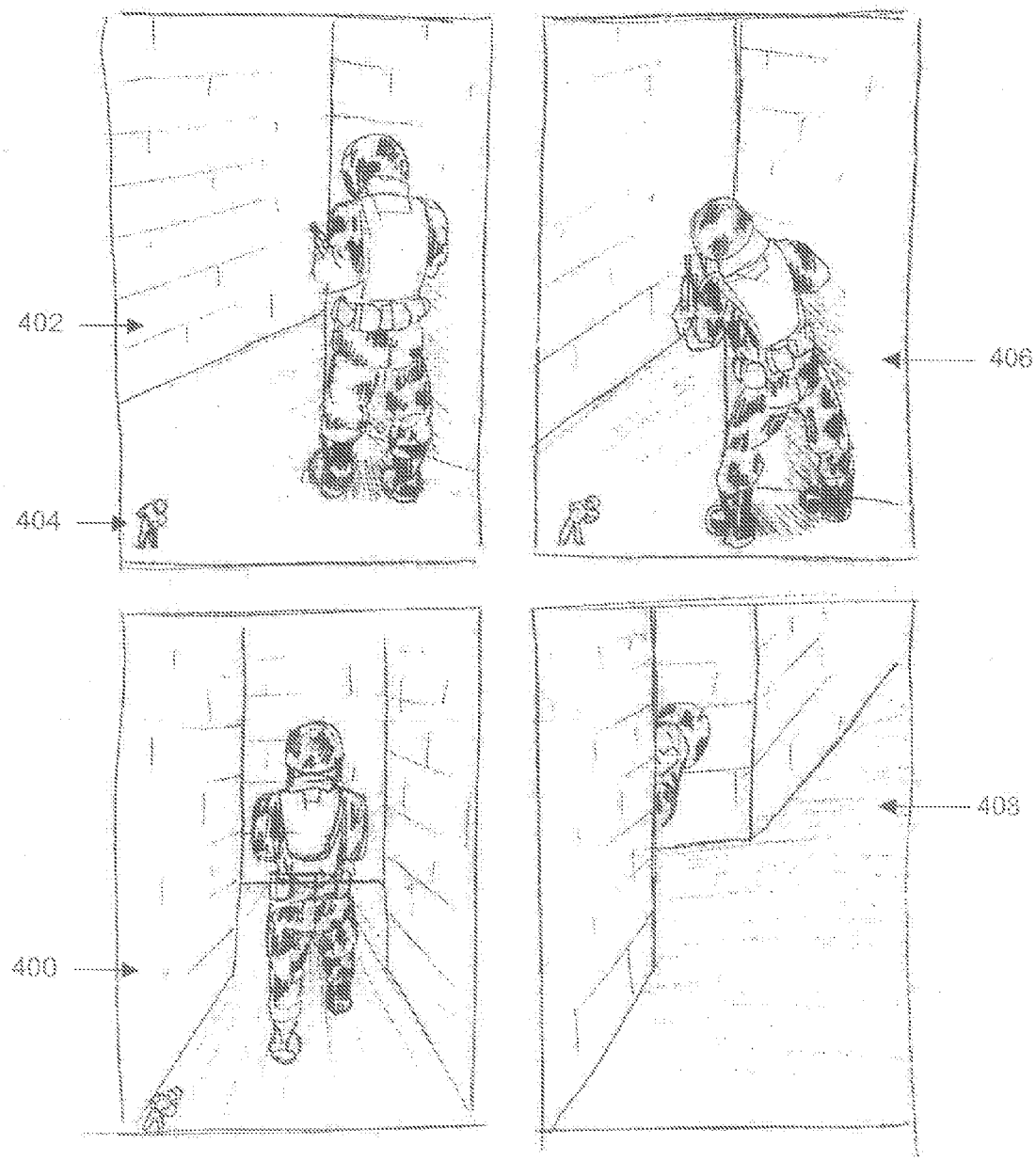

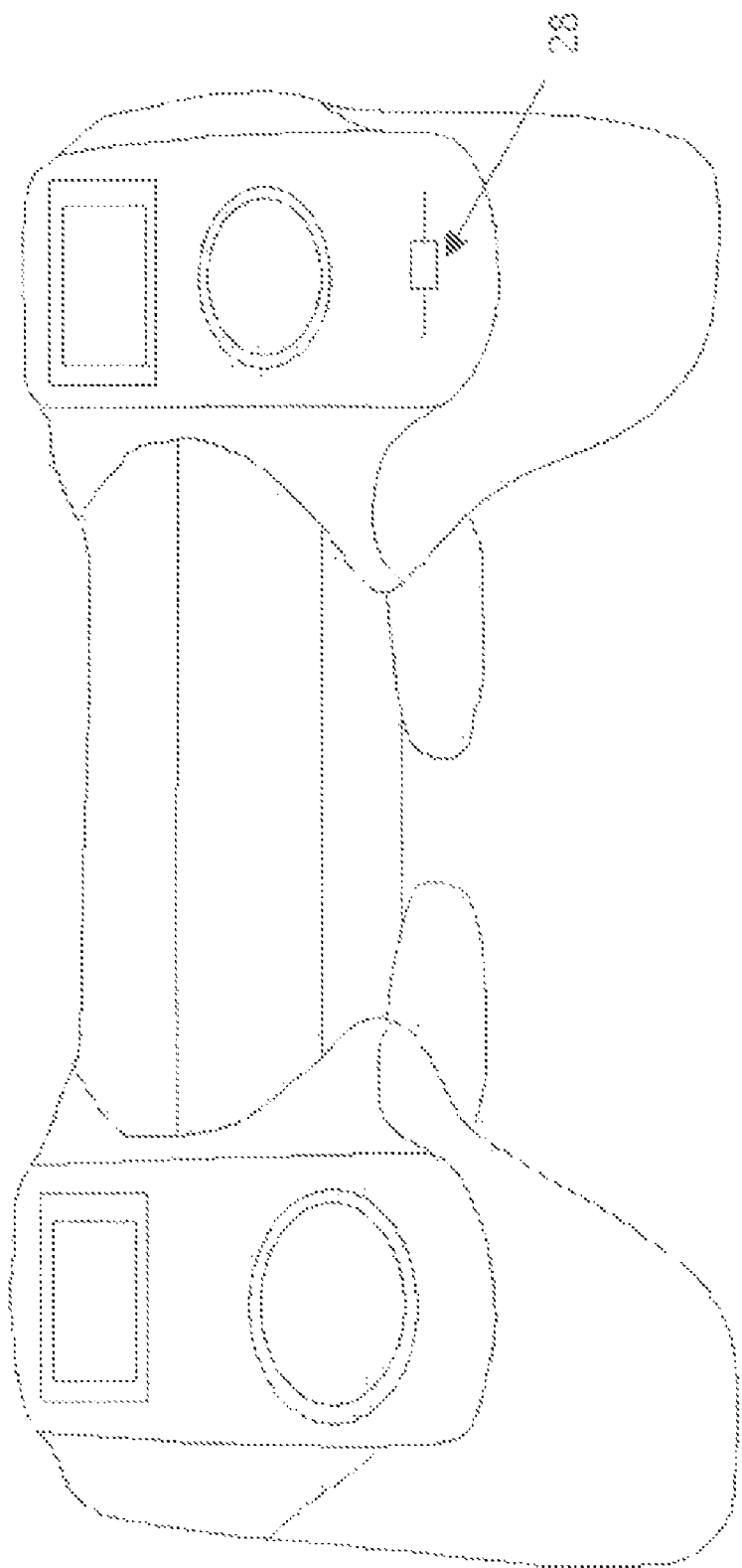

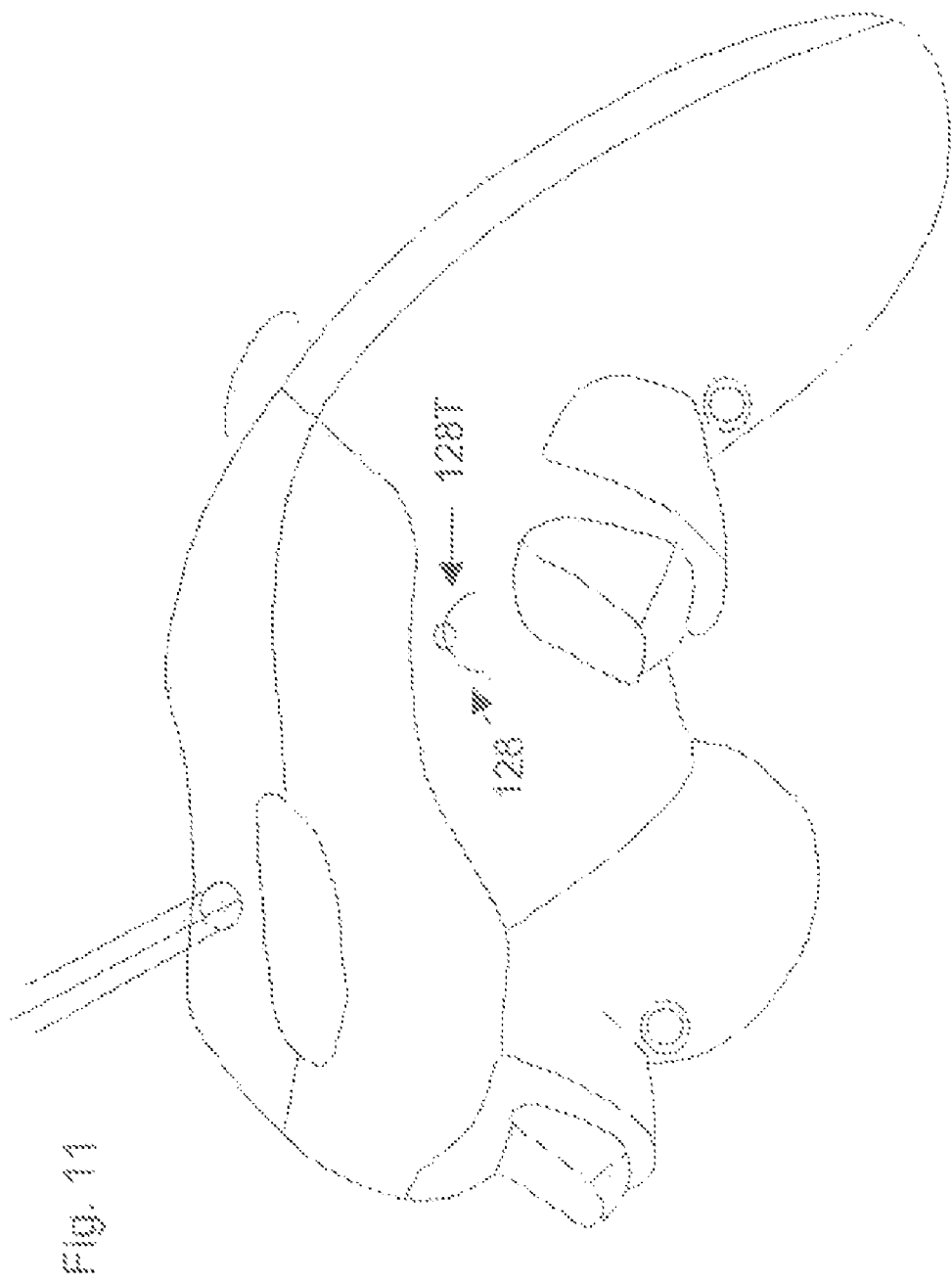

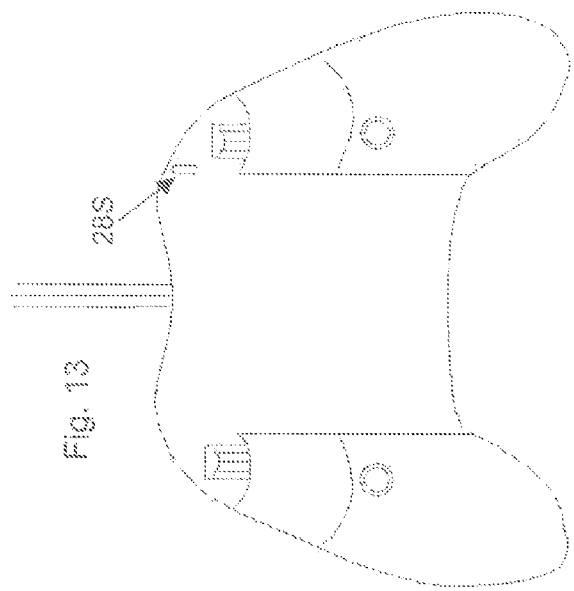
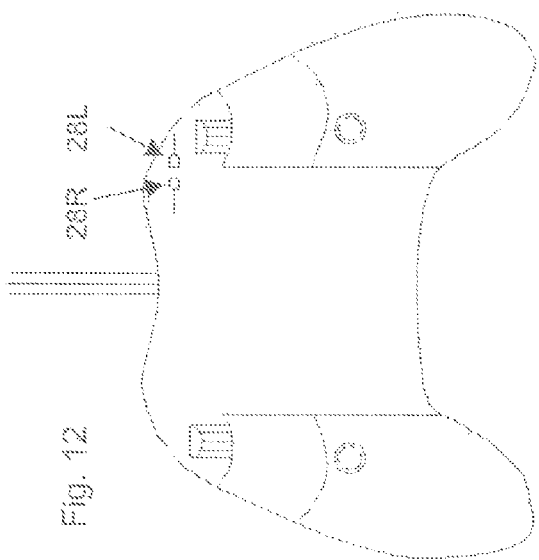

VIDEO GAME CONTROLLER

RELATED APPLICATIONS

This application is a continuation to application Ser. No. 11/207,456 filed Aug. 19, 2005 now U.S. Pat. No. 7,235,012, which claims priority to U.S. Provisional Patent application Ser. No. 60/603,578 filed Aug. 23, 2004 and incorporated herein by reference.

BACKGROUND OF THE INVENTION

A. Field of Invention

This invention pertains to a game controller and more particularly, to novel components that control the movements of an action figure in a game in a much more realistic manner than in the prior art. The controller may be used with a dedicated electronic apparatus or a general purpose computer such as a PC. Additionally, the locations of some of the existing components have been shifted to render the controller more ergonomic.

B. Description of the Prior Art

An article in the Jun. 5, 2005 issue of the New York Times described how joy sticks were originally used for controlling airplanes at the beginning of the twentieth century. In any event, joy sticks or video game controllers became popular as the preferred devices for controlling video games.

As originally developed in the 1970's, joy sticks had a lever pivoting from a central joined and spring biased toward a neutral position. The lever was accompanied by a programmable single push-button used for various functions in different games.

Game controllers continued to evolve from their one button origin to a configuration with several buttons and other control means calculated to give a player the illusion of being completely immersed in the virtual world of a game. One typical game controller is Sony's Dual Shock controller (described in U.S. Pat. No. 6,394,906). This controller has a plethora of buttons and other control means. For example, it includes two analog thumb sticks, a D-pad, four digital face buttons, two sets of left and right digital shoulder buttons placed on the same vertical plane in close proximity to each other and a start and select button.

In the past, like many previous video game controllers, the Nintendo SNES controller relied exclusively on the D-pad to achieve character movement. (The D-pad is a digital cross-shaped directional pad, illustrated in more detail below). The pad was used to turn movement on or off. Once movement was activated, the character would only move in a given direction at a constant speed. Needless to say, this action was very stilted and looked and felt too awkward to be realistic.

Subsequent advancements in technology enabled the video game industry to shift from flat 2D visuals to fully-realized 3D worlds. These advancements necessitated additional components for character actions, such as four digital face buttons and two to four digital shoulder buttons. A left analog stick was used that was more than adequate for character movement, wherein controlled walking and running was accomplished with a relatively low degree of precision, as opposed to looking and aiming in a three dimensional environment, which requires tremendous precision to achieve with accuracy. Therefore, using the right analog stick 14R solely for viewing the game environment or aiming a weapon is severely limiting to the game player.

At the Electronic Expo or E3 held on May 11, 2004 in Los Angeles, Sony announced a new portable video game system called the PSP®. Internet video game news websites, like gamespot.com, covered by the PSP's components and functionality. One example of gamespot.com documenting the new device is an article published by James Yu on Feb. 4, 2005 appearing in the "Hardware" section of Gamespot.com's website and entitled "PSP 101". In the afore-mentioned article the PSP® is shown with an analog tracking button. This button relies on significant measurable sliding movement in all directions on the horizontal plane to allow the game character to walk or look around the game environment. There are several reasons why this approach is still unsatisfactory.

The look/aim movement in existing games equates to the game character turning its body left and right from head to toe. The problems with using the right analog stick 14R or the PSP's sliding analog button for the look/aim function include:

diminished control over the precision movement of the look function as a result of the extended tilting area of the right analog stick 14R (the greater the tilting range of the stick the less control the player has over the look/aim function). The PSP's analog sliding button, which is better than the right analog stick 14R for the look/aim function, still falls short of precision control as a result of its extended sliding range in the horizontal plane.

A video game player using the right analog stick 14R for the look/aim function will face a slow reaction time when reaching for the four main digital face buttons (12A, B, C, and D) as a result of having to lift their right thumb off the right analog stick 14R and press it onto one of the four main digital face buttons.

In addition, there are several problems associated with the placement of the left and right digital shoulder buttons (32L and 32R) on existing game controller, including:

a. fatigue as a direct result of the game player elevating his middle fingers for lengthy time periods to reach and manipulate the left and right digital shoulder buttons (32L & 32R);

b. discomfort and cramping from the repeated back and forth motion of the video game player lifting his middle fingers from their natural down and back position to press the left and right digital shoulder buttons (32L & 32R) directly under and on the said vertical plane as the left and right analog triggers (30L & 30R); and c. slow reaction time for the video game player when he has to lift his middle fingers from a natural down and back position to a very different elevated angle to press and utilize the left and right digital shoulder buttons.

Other attempts have been made to improve the design of the standard video game controller. For example, the U.S. patent application publication US20040090416 expands the configuration of a current video game controller by adding an action button. In U.S. patent application publication US200440090416 an action button, (shown by numeral 54 in FIG. 2) can record 1 series of complex attack actions, through the use of a specialized memory controller, and then execute all of the attack movements consecutively with one press of a single action button. Problems with using the action button 54 include:

diminished ability of skilled players who rely on hand eye coordination and intellectual strategy to perform difficult game maneuvers to distinguish themselves the elimination of a fair and balanced game play environment several limitation of the range of competitive parameters upon which all video games are based, as all players will be able to set up and execute extremely complex combat maneuvers via a single button press.

SUMMARY OF THE INVENTION

The invention comprises a system and method for enabling video game players to simulate the natural "look" movement of a game character on a display 108 by the addition of a quick look button 28. The quick look button allows a player to cause a game character's head and/or upper body or torso (from the waist to the head) to be turned independently of the lower body (from the hips to the feet), to simulate the natural glance quick look movement of humans. The result is that the player can see on his screen what lies in the character's field of vision as the character turns his head. Preferably, quick look button 28 is implemented as an analog button that can move discretely or continuously along a predetermined range. Moreover, in one embodiment, the button can be clicked in for a secondary function with different results based upon whether or not the game character is stationary or moving. In addition, an analog tracking button 10 enhances the video game player's control over the 360 degree look/aim function, in all horizontal and vertical directions in a 3D environment, by comparison to the accuracy of a right analog stick 14R. The invention also includes placing the left digital shoulder button 32L, and the right digital shoulder button 32R in recessed positions below the left trigger 30L and the right trigger 30R, respectively, to make them more ergonomic and accessible to the fingers of gamers during extended game-play sessions. Whether a character turns only, his head, only his upper body (or torso) or the head in addition to the upper body is a function of the software used by an electronic game to which the novel video game controller is connected.

BRIEF DESCRIPTION OF THE FIGURES

FIG. 2 is a bottom view of the video game controller 100 illustrating the location of an analog quick look or sliding button 28 and left and right digital buttons (32L & 32R) shifted to a new, ergonomically desirable positions;

FIG. 3 is a three-quarter perspective view of the video game controller of FIGS. 1 and 2;

FIG. 4 illustrates how a conventional character turns;

FIG. 5 shows a character moving his torso in accordance with this invention, button 28;

FIG. 6 shows a map of a portion of a game traversed by a character using the video controller of FIGS. 1-3;

FIG. 7B shows a story board representation of a similar but slightly different scenario of the actions that take place in FIG. 6;

FIG. 8 shows a character peeking around the corner in accordance with this invention;

FIGS. 10A and 10B show different kinds of video controllers incorporating a quick look button 28 in accordance with this invention;

FIG. 11 shows an alternate embodiment for the quick look button with a C-shaped track, respectively;

FIG. 12 shows an embodiment with two quick look buttons, one for looking left, and the other for looking right;

FIG. 13 shows an alternate embodiment with a tilting quick look button; and

FIG. 14 shows another kind of game controller incorporating the subject invention.

DETAILED DESCRIPTION OF THE INVENTION

Figure 1:
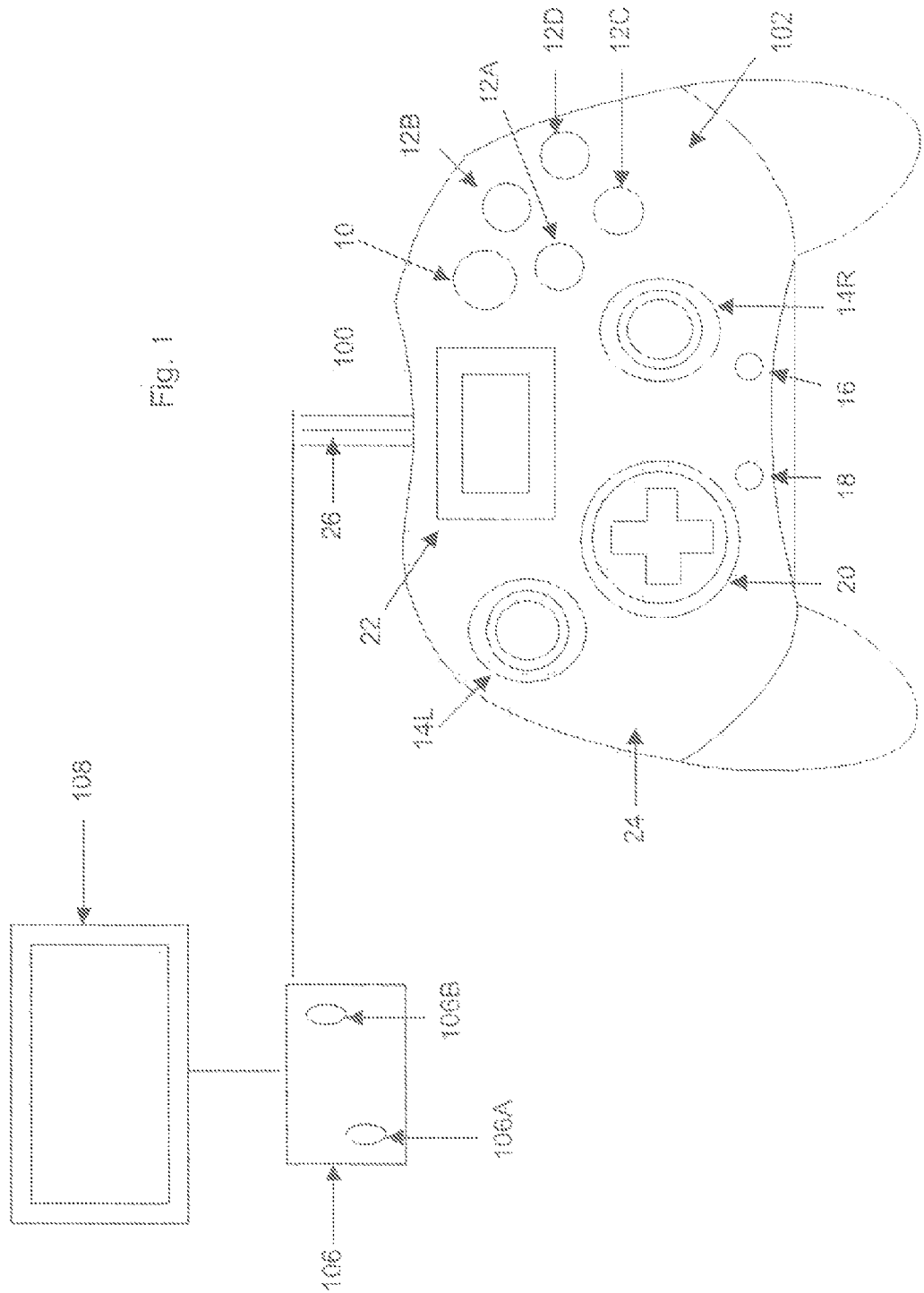
FIG. 1 is a top view of a video game controller 100 incorporating an analog tracking button 10 in accordance with the present invention.

The present invention is described in conjunction with video controllers used to play first and third person shooting and other similar types of action games, but may be incorporated in other types of games as well. The video game controllers shown in the drawings incorporate several improvements, including an analog quick look button 28 and, optionally, an analog tracking button 10. As described in more detail below the quick look button 28 is preferably a slide-type control device. The analog track button 10 is a device that relies on its resistive nature to add precision to the game-play. Like all the other control components on a game controller 100, these components are also programmable by game developers, meaning that the response of a game to the activation and movement of these buttons is determined by software. However, preferably, they are programmed to create a new kind of movement for game characters, as described in more detail below, which enables game developers to greatly improve the new game-play experiences of players.

A further change is that the locations of two known digital shoulder buttons (32L & 32R) have also been changed to increase their accessibility and their prolonged use level of comfort.

More specifically, FIGS. 1-3 show a game controller 100 constructed in accordance with this invention. The controller 100 has a casing 24 with a top surface 102 and a button surface 104. Disposed on these surfaces there are a plurality of devices that are used by a player to generate commands for an electronic game 106 including a processor 106A, a memory 106B holding software and firmware, and being associated with a screen or other visual display means 108. The controller 100 is connected to the electronic game 106 either with a physical cable or connector 26 or by wireless means, including BLUETOOTH, WIFI or other similar channels. The electronic game 106 may be a PlayStation®, an Xbox®, and other dedicated gaming devices or even a general purpose computer.

The various devices provide a player the ability to perform certain maneuvers with game characters on screen 108. For example, a left analog stick 14L allows the video game character to walk/run forward and back, and strafe (side step) to the left and to the right. A right analog stick 14R allows the video game character to turn his entire body, from his head to his feet, to the left or the right. Stick 14R also facilitates the game character with other look/aim functions in a full horizontal and vertical three-dimensional 360 degree radius. The walking movement is controlled by the left analog stick 14L. Combined with the entire body turning movement of the right analog stick 14R, it enables a player to cause a video game character to turn his entire body and then walk or run into a new direction. This is essential to the video game character's ability to move through the game environment. The other buttons 12A-D, 16, 18, 22 etc. all provide various functions well known to players.

The various elements of the controller 100 are listed below for the sake of completeness:

| | |
|---|---|
| 24 | housing |
| 10 | novel optional analog tracking button |
| 12A, 12B, 12C, 12D | digital face buttons |

-continued

| | |
|---|---|
| 14R, 14L | right and left analog sticks |
| 16 | start button |
| 18 | select button |
| 20 | D-pad |
| 22 | logo |
| 26 | electric connector |
| 28 | novel quick look button |
| 30R, 30L | analog triggers |
| 32R, 32L | digital shoulder buttons |
| 34 | slot for memory card |

A critically important facet of natural human movement has been missing from video games, especially since they entered the realm of 3D environments. That is, a game character can only look, shoot, and move in the same direction. So, for example, if a character is walking down a corridor he can only look straight ahead and shoot straight ahead. If he wants to look right or left he must first turn his whole body, which will initiate the game player to do one of two things; completely after the direction of the game character's movement or force the game charter to come to a full stop and then look to the left or to the right.

The reason for this unnatural behavior is illustrated in FIG. 4. As shown in the top panel 200, the stick 14R is tilted to the left and maintained in that position. In response, as shown in panels 202, 204, and 206; character C positioned initially to face forward, and then his whole body is turned to the left. This action is maintained, that is the body is kept turning until the stick 14R is returned to its normal or neutral position. This motion can be combined with other actions, such as causing the character to step forward or backward, raising his arm, firing a gun, etc. However, throughout all these actions, the body and the head are always turned in the same direction. Problems with using the right analog stick 14R exclusively for look/aim function include:

forcing a game character to unnaturally turn its entire body, from its feet to its head, left and right, at all times, to view the game world (even when the game player has no intention to cause the game character to walk in either of those directions);

leaving a game character vulnerable to attack by restricting it to turning its entire body left or right to view their surroundings when a quick glance in either of those directions would be more appropriate; and reducing the character's mobility because once he has turned his body right or left, he must turn his body back again if he is to move forward.

There are innumerable game situations where it is desirable to have the character "look" in a given direction, by naturally turning its head or upper body with speed and efficiency, to scout an area for potential danger (as a human soldier would do in real life). However, it is slow and illogical for the game character to turn its entire body during this time because it leaves its back exposed to enemy fire. In every direction it wants to scan but not traverse. FIG. 7B depicts an example of the advantage independent upper body rotation, facilitated by button 28, affords the player in real-time gameplay situations. Plate 500 shows the character C walking forward down the hallway 260. As he approaches the hallway on his right 262, while continuing his forward motion, he slides the quick look button 28 to the right and holds it there (depicted in plate 502); this rotates his upper body (torso) in the corresponding direction and allows the character C to keep his forward movement while passing and looking down the hallway 262 on the right. In plate 504, the game character C has passed the hallway on the right 262 yet before he reaches the hallway on the left 264, while continuously walking forward, the player quickly slides button 28 from its furthest right position on its defined track 26B to its furthest left position. Doing so enables the player to keep his forward direction while quickly turning his full view (torso) to the left in preparation of confronting possible danger (in the form of object 266) down the hallway on the left 264. In contrast, if a player attempted to approach the same situation with today's model for game character movement the following would occur. As depicted in plate 506, a player using a standard game controller without the analog quick look button 28 would have to first rotate the character's C entire body (feet to head) from a forward facing position to the right. At this point the character C will have to begin to strafe or side step to the left to continuously move down the main hallway 260. As a result, before the player can turn a full 180 degrees to the left, the player will expose his back to potential enemy fire 266 coming from the hallway on the left 264; this illustrates the impossibility of the player to keep his forward movement down the main hallway 260 while safely looking in the adjacent hallways on his right 262 and his left 264.

This problem is resolved in the present invention by the provision of a sliding spring loaded button 28 which is referred to herein as a quick look button. As shown somewhat diagrammatically in FIG. 2, button 28 consists of a knob 28A moving in a track or groove 28B. The knob 28A is based by springs (not shown) to the center position shown in FIG. 2. The player can then shift or slide the switch laterally either to the left or the right.

The quick look button 28 endows a video game character with the ability to turn its head and (optionally) the upper body (from its waist up) independently of its lower body (from its hips to its feet), which enables the video game character to move in a forward direction, yet look simultaneously to the left or the right, among many other new combinations of movements and look abilities.

As shown in FIG. 2, preferably button 28 is positioned above and to the left of the analog trigger 30L. In one embodiment, this action enables video game players to turn the head of the video game character, independently of the upper or lower body, thereby simulating the natural way humans look left or right while walking in a straight line. Preferably, the angular position of the head an the speed at which the head is turned tracks the position of the quick look button 28. In this manner, the head of a game character can be turned to an anatomically correct angle, typically, about 90 degrees, in either direction. As mentioned above, the quick look button 28 is biased by springs to its center position. As a result, when the button 28 is released, it automatically returns to its center or neutral position, shown in FIG. 2. In response, unless other action is taken by the player, the head of the character returns to the forward position at the same time.

This concept is aptly illustrated in FIG. 5. In panel 210 a player slides the quick look button 28 to the left. In response, the character C turns his head to the left. If the button 28 is released, C's head returns so that the character is "looking" again straight forward. This sequence is referred to herein as a quick look movement and it simulates the natural movement of a person whose body is facing a forward direction and the person looks laterally or sideways for a short time period. Preferably the movement of the head is proportional to the movement of the quick look button 28. The limits of the movement correspond to the limits of movement of a natural body, i.e., about 90 degrees in each direction.

The quick look button 28 can also be depressed at any position of knob 28A analog track 28. In one embodiment, if the button 28 is depressed or "clicked in" and the character is not moving, the relative angle between the head and the rest of the body of the person is "locked in" and remains unchanged even if the quick look button 28 is moved to another position, or is released so that it returns to its central or neutral position. In this embodiment, if the character is stationary, the head is "released" by depressing or clicking the quick look button 28 again. If at this time, the quick look button 28 is in its neutral position, the head returns to the forward position. If the quick look button 28 is at different position along track 28B when it is clicked, the game character's head quickly turns to a new angle corresponding to the position of the button 28 along the track 28B when it is clicked a second time to unlock the head. Conversely, if the character is moving while their upper body is turned to the left or right, with or without a locked view, and they click in button 28 their lower body (hips to feet) will always turn to face the direction of their upper body (waist to head).

The analog quick look button 28 is designed so that it can work in conjunction with the other components of the video controller 100 and not replace them. For example, operating quick look button 28 together with right analog stick 14R can cause the turning of the character's body and head at the same time.

In another embodiment of the invention, the analog quick look button 28 is used to control the position of the upper body. In this embodiment, when the player slides button 28 left or right, he causes the whole upper body of the game character to pivot with respect to the lower body. This embodiment is effective, for example, in a shooter game where the game character can shoot to the right or left while still facing or walking forward. In one embodiment, clicking button 28 while the character is not moving can cause the angle of the upper body to be locked until released, as discussed above.

Clicking the quick look button 28 while the character is moving causes the lower body (or hips) to be turned quickly in alignment with the upper body (or head). This operation may be combined with various other effects, such as walking, running, etc. In other words, while the character is walking, sliding the analog quick look button 28 left or right by some amount causes the head to turn by a corresponding angle. Clicking the quick look button 28 while the head is turned causes the rest of the body to turn and come into alignment with the head whereby the whole body is now facing in a new direction. The same operation takes place if the character's whole torso is turned by button 28 instead of just its head.

Whether just the video game character's head or its entire upper body (torso) may be a programmable parameter that is constant for the whole game. Alternatively, the parameter may be context sensitive. More specifically, the parameter may change as the game is played, dependent upon various factors, including the context of the video game at the specific time at which the look control is invoked. For example, the video game designer may design the game such that only the head is turned if the character is unarmed, but the entire upper body is turned when the character is armed. In one embodiment, the video game character's entire upper body is turned, so that the character may e.g., employ a simulated weapon supported by its hand and arm or hands and arms. For better realistic effects, a game may be programmed so that even non-controlled characters (e.g., characters not controlled by a player) can turn their heads or their upper body.

Figure 7A:
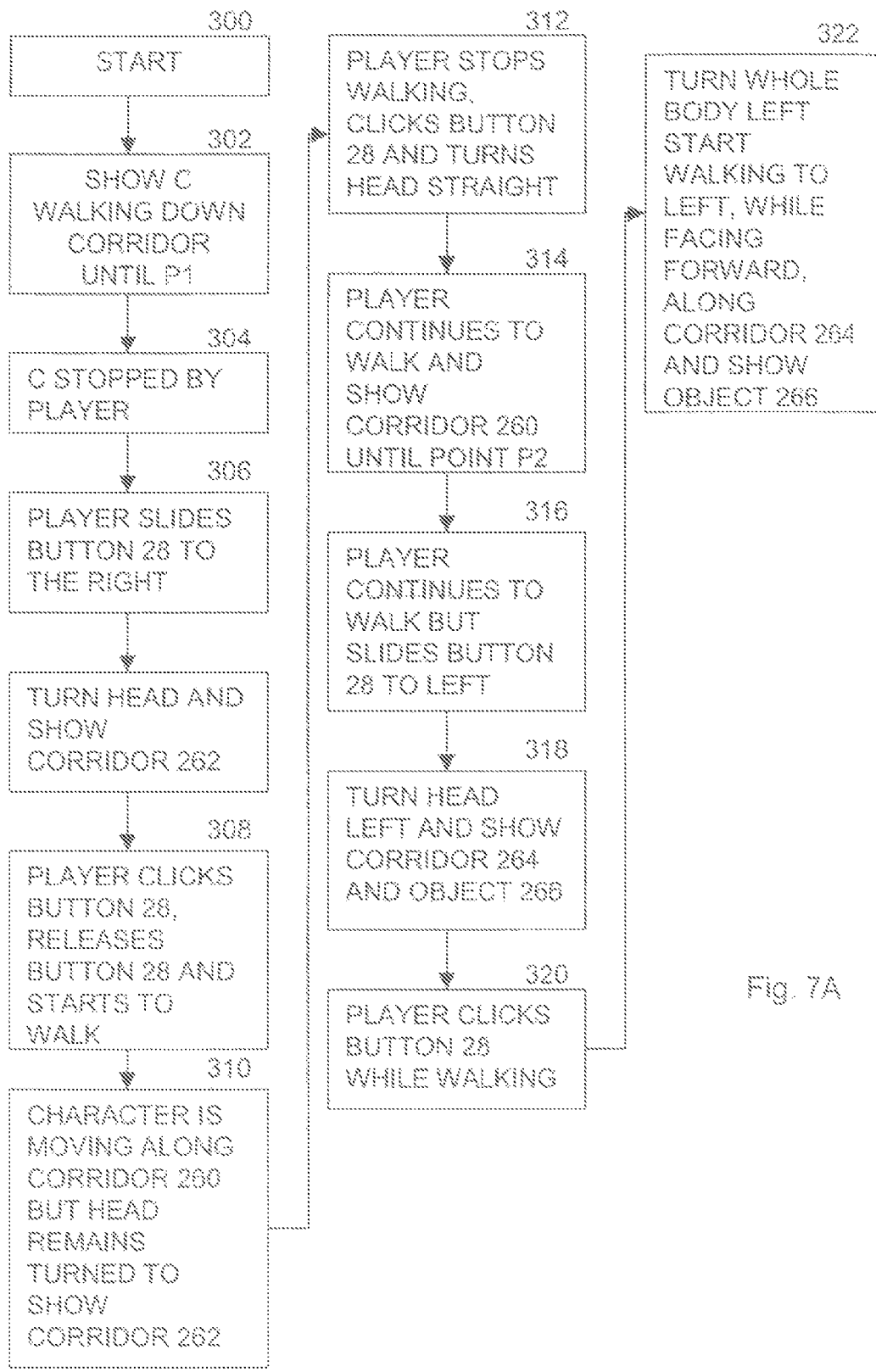
FIG. 7A shows a flow chart illustrating commands issued and the corresponding movement of the character in FIG. 6.

FIGS. 6, 7A, 7B present a relatively simple scenario for a game and illustrate some of the features and advantages of the quick look button 28. FIG. 6 shows a plan view of playing field consisting of a main corridor 260 and two side corridors 262, 264 branching off from the main corridor. FIG. 7A describes the action of a player using the controller 100 to move a character through the corridor. The action starts in step 300. In step 302 the character C is shown on display 108 facing forward and walking down corridor 260 until point P1—the branch off point for corridor 262. At this point, the player stops the character C (step 304) and the player slides the button 28 to the right (step 306). This action causes the character to move its head to the right and the player is shown the scene seen by the character, i.e., corridor 262 (step 308). The player then clicks in the quick look button 28, releases it and starts the character C walking again up along corridor 260 (step 310). The character C keeps its head turned to the right (locked) as it walks straight and the player is shown the remaining part of corridor 262 (step 312). Once the character is past the corridor 262, the player stops walking and clicks in button 28 at its center or neutral position, the character's head returns to the central or neutral position to gaze straight ahead until point P2 (step 314).

Next, at point P2, the player continues walking the character C while at the same time he slides the analog quick look button 28 to the left (step 316). The character C walks straight, but turns its head left. The player is then shown corridor 264 with object 266 (step 318). The player sees the object and clicks the quick look button 28 while moving forward (step 320). This causes the character C to turn its whole body immediately (so that it is now facing to the left), and start walking down the corridor 264 toward object 266 (step 322). At this point, because the character was moving and not stationary when the analog quick look button 28 was clicked in, the player must release button 28 to its neutral position to reset its standard functionality for use again.

This sequence illustrates how various commands on the video controller triggers corresponding actions of the character.

In another embodiment, the video controller and its software are adapted to provide a response to the activation of the analog quick look button 28 that is dependent on other factors within the video game. In this embodiment, actions of the game character are used to invoke a special function. For example, the video game environment may include at certain times or at certain places or locations within the game an icon that indicates that the quick look button 28 may perform a special function within that context. In just one example of many possible specific quick look button 28 context-sensitive features, the icon may indicate that if the game player moves the quick look button 28 while near a certain portion of the currently-displayed game environment, the game character may peer around a corner with analog precision, by leaning its upper body to one side or the other until the head reaches past the corner. In this example, illustrated in FIG. 8, in plate 400 the character is walking down a corridor. In plate 402, the character reaches a corner and the game designer pre-labeled some portions of the game environment with icons, such as 404 that indicates to the game player that he has option to exercise the special function of the quick look button 28 or not, for example by closely approaching a game environment feature like a corner or not. In one embodiment, the icon 404 may graphically represent the associated special function of the quick look button 28. For example, the icon may depict a leaning game character to indicate that the quick look button 28 will allow the game player to cause the game character to lean at an appropriate point in the game environment with analog precision; whereas, in today's games the character is forced to digitally lean out which either over or under exposes his position and thereby places him in danger or limits his view. In one embodiment, the icon's location on the video screen 108 may be uncorrelated with the part of the game environment at which the game player may exercise the special function. For example, the location within the game environment at which the special function can be invoked may be clear from the context of the game at that time.

Alternatively, the icon may be located upon or close to the part of the video game environment at which the special function may be invoked—for example an icon may be placed upon a corner wall where leaning around that corner wall is possible. As another alternative, the icon may only represent a general indication that a special function of the quick look button 28 may be invoked within that environment, for example, to make the game more challenging by requiring the game character to explore the environment to discover precisely where the special function may be exercised. To complete the explanation, in plate 406 the character has leaned forward so that he can pear around the corner, as seen plate 406 thereby exposing only a small portion of his body.

Figure 9:
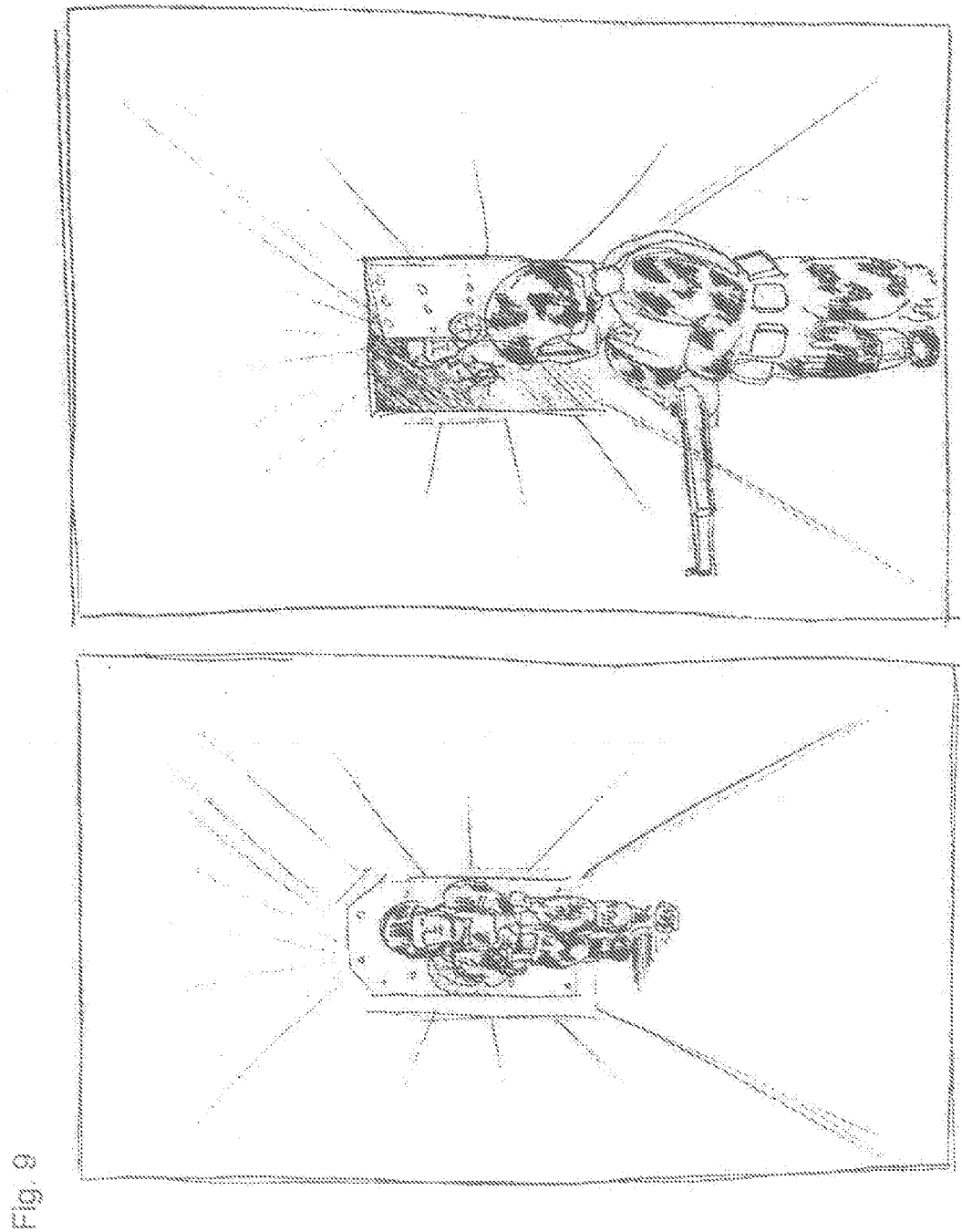
FIG. 9 shows a character looking behind him by turning his torso and head in accordance with this invention.

In another embodiment, the analog quick look button 28 can also be moved to the left or right at any time to realize various extended functions with different or enhanced results. For example, in most instances, the character is able to rotate his head by up to 90 degrees in each direction (left or right from a forward facing position) for a total field view of 180 degrees (from the far left to the far right or vice versa). However, in some instances, a more extended view is required. For this purpose, when the special extended option is enabled by pressing and holding in one of the many action buttons on the controller 100 first, the character can move his head so that he can change his view by up to 180 degrees. This feature may be useful when a player wants to look behind the character without turning the character or otherwise change his direction of movement. One realistic way of implementing this special feature is to rotate the upper torso by 90 degrees and the head by an additional 90 degrees to obtain a total rotation of up to preset limit, such as 180 degrees (this extended function of the analog quick look button 28 will only occur when a designated action button is pressed in first or simultaneously). This feature is illustrated in FIG. 9. The analog sliding or quick look button 28 will always return to its centered position when it is released, even after it has been clicked in, while the video game character's view will remain locked in the game world (stationary click) until the analog sliding button 28 is clicked in once more. The game character's view will return, from looking to the left or right (in a locked position) with only its head and torso to a forward-facing position. Note that the game character can move with a locked view at an angle as discussed before. In one embodiment, the game character's view will only lock if the clicking function is initiated when the character is stationary (as opposed to clicking the quick look button 28 when the character is moving, which will bring the game character's lower body to face the direction of his upper body—the analog quick look button 28 needs to be reset by releasing it to its neutral position only when it's been clicked in while the game character is moving). Put simply, a new function of the quick look button 28 may be invoked by the game player when he manipulates another button on the controller before manipulating the quick look button 28. For example, the game player may hold down the A button of a standard video controller and then use the quick look button 28 to cause the video game character to look over its shoulder, possibly even after using the quick look button 28 to rotate the game character's upper body or entire body.

Another improvement presented herein is the analog tracking button 10. Preferably this button is placed above and to the left of two of the digital face buttons 12A and 12B of a standard video game controller, as shown in FIG. 1. Functionally, the analog tracking button 10 is similar to and can be used to perform all the actions of the right analog stick 14R. The main difference is mechanical. Instead of a joy stick, the button 10 can be implemented as smooth ball rotating in a socket (not shown) and optical sensors trained on the ball. Thus button 10 has the same structure as a track ball that has replaced the mouse as a pointing device. However, the video game player's control over the 360 degree look function, in all horizontal and vertical directions in a 3D environment, will be executed with much greater precision with the analog tracking button 10 by comparison to the accuracy of the right analog stick 14R.

The advantage of the tracking button 10 resides in its resistive nature, its non tilting nature, and its barely discernable sliding movement, in all directions, only on the horizontal plane. The game character's vertical look function comes from the video game player pushing the tracking button 10 forward or back (for the right analog stick 14R it would be tilting forward or back) while the game character's left and right look function comes from the video game player pushing the tracking button 10 to the left or the right (for the right analog stick 14R it would be tilting to the left or the right) which in turn rotates the game character's entire body from head to toe; thereby, enabling the game character to walk, using the left analog stick 14L, in any direction.

The tracking button 10 dramatically improves the analog precision movement over the look function because the speed of the game player's viewing movement will be dependent upon how hard the player pushes against or tries to slide the analog tracking button 10 (in any direction on the horizontal plane) and not on how far the player tilts the right analog stick 14R, which is where accuracy in the look movement is lost to over or under tilting, using standard video game controllers. Also, the analog tracking button 10 will sit slightly higher than the four main face buttons 12A, B, C, and D in an effort not to interfere with them when the tracking button 10 is in use by the video game player's right thumb.

Figure 10A:
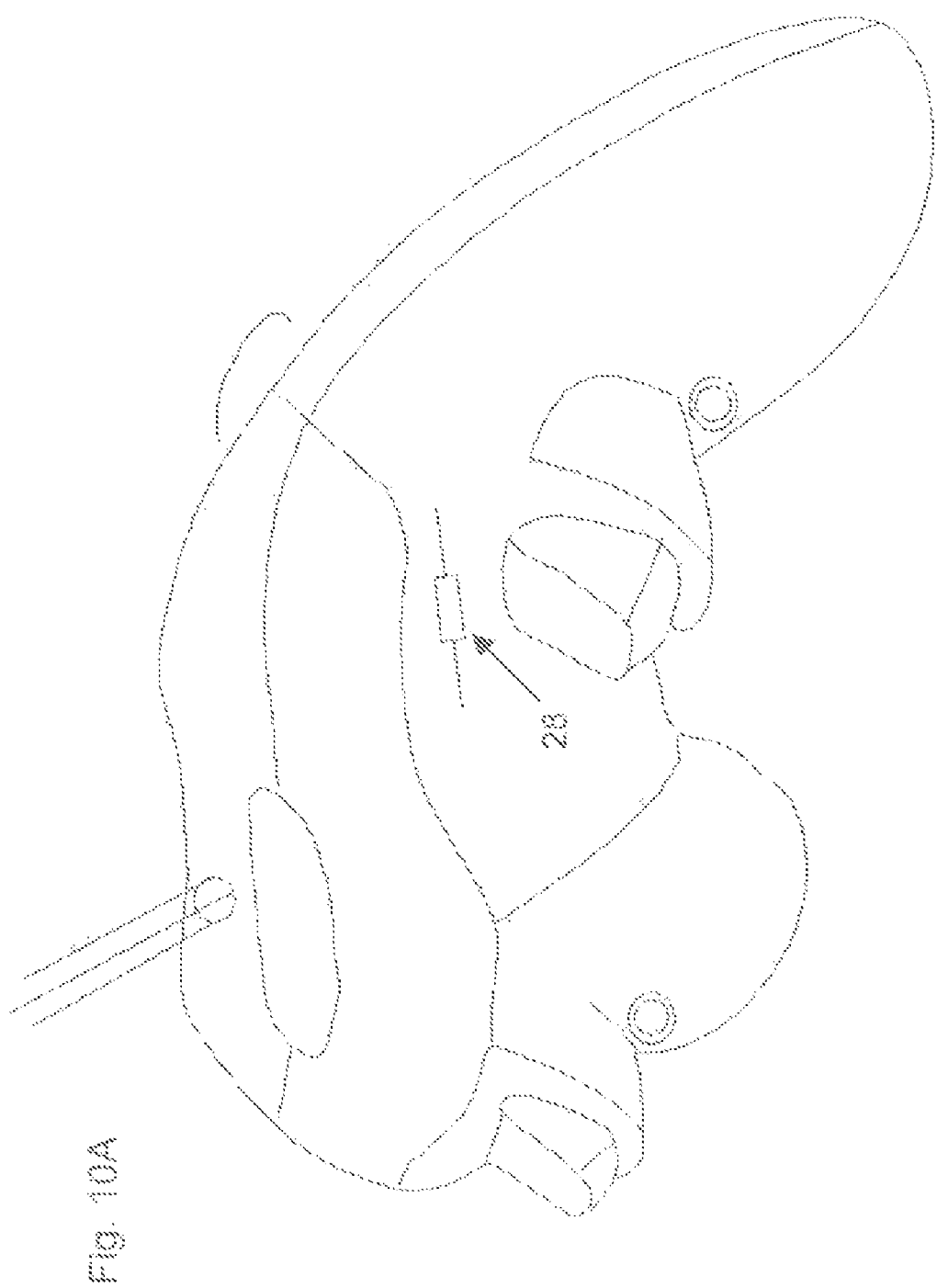
Figure 10C:
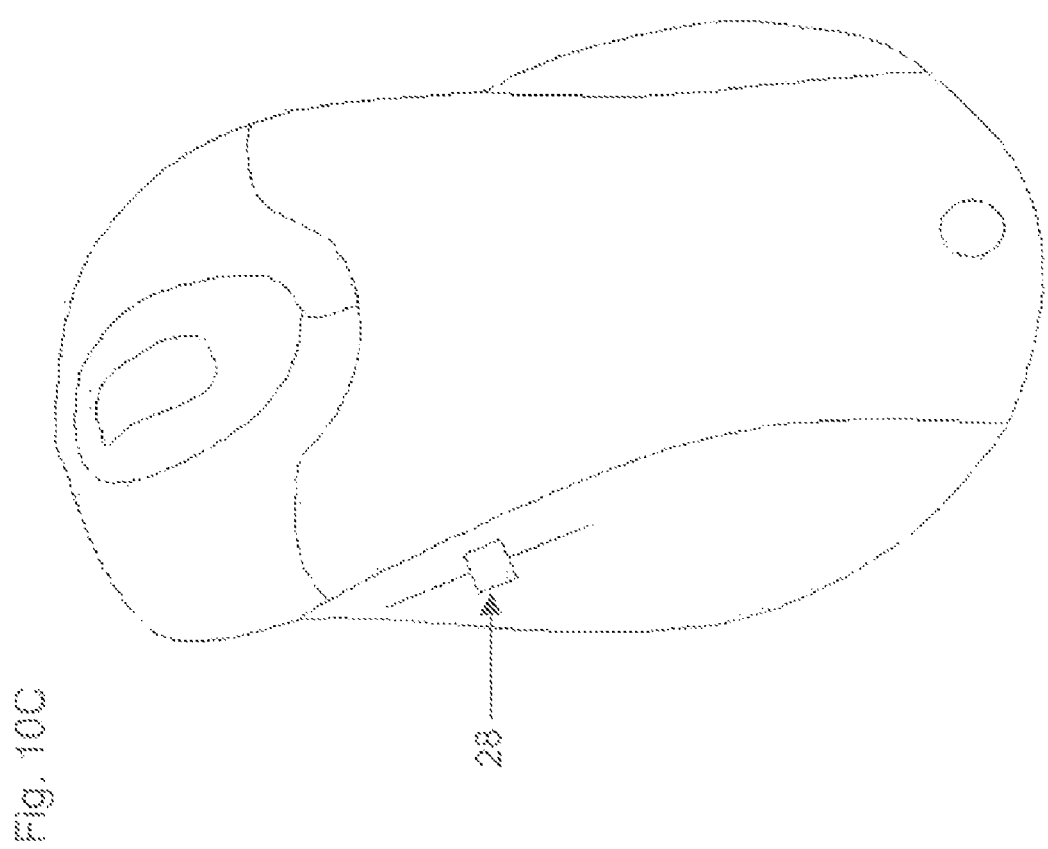
FIG. 10C shows a PC mouse incorporating a quick look button 28 in accordance with this invention.

Preferred locations for buttons 10 and 28 are shown in FIGS. 1-3. However, other locations may be desirable as well. Moreover, while the invention was described primarily in association with the Xbox® FIG. 10A and PlayStation® FIG. 10B video game controllers, one or both types of devices could be incorporated into other types of pointer devices as well. For example, FIG. 14 shows the analog quick look button 28 in the Xbox 360® controller while FIG. 10C shows a PC mouse with an analog quick look button 28.

A further improvement presented herein is the position of digital buttons 32L, 32R. As shown in FIGS. 2 & 3, preferably, the left digital button 32L and the right digital button 32R are disposed in a recessed position below the left trigger 30L and the right trigger 30R to make them more ergonomic and accessible to the middle fingers of gamers during extended game-play sessions. Conventionally, digital buttons 32L and 32R are located directly under the left and right analog triggers 30L and 30R on the same vertical plane. This required the video game player to elevate or lift his middle fingers to press the 32L and 32R digital buttons. When holding a standard video game controller the game player's middle fingers naturally lay in the same recessed position that the digital buttons 32L and 32R were moved to; herein is no longer a need to reach for these buttons during game-play.

Turning now to the figures, FIG. 1 is a top view of the video game controller, with a standard button configuration, except for the addition of my analog tracking button 10.

The plastic casing 24 is in the form of a standard video game controller with an estimated length of 4.6" and a width of 6.0". The length and width can vary depending on how large or small the manufacturer wants the video game controller to be. The analog tracking button 10 of the invention is slightly concave and made of a rubber type material. The tracking button 10 is very resistive to sliding (or any movement) in all directions on the horizontal plane and is preferably used for the look function. The amount of sliding movement, for the analog tracking button 10, in all directions on the horizontal plane is barely discernable to the video game player; it features a complete lack of tilting motion coupled with a limited movement/resistive design. The four main plastic digital face buttons of a standard video game controller, used to provide more game character actions, are 12A, B, C, and D.

My improved video game controller achieves its result as follows: the microchip inside the game controller receives signals from the analog quick look button 28 when it is moved to the left or the right. The game controller then communicates with the video game console via the electrical cord 26 thereby enabling the left and right head or upper body movement independently from the lower body movement of the game character to be displayed on the display 108. The resistive nature of the tracking button 10 will enable console video game players to experience precision control over the look function previously only available to PC video game players using the mouse. The process of signals being sent and received for the tracking button 10 will function in a similar manner to the aforementioned analog quick look button 28. The new location of the left and right digital buttons 32L and 32R will prevent fatigue for the game player and will afford them instant accessibility to the pressing of the four main face buttons 12A, B, C, and D.

There are many alternative ways to implement and place my tracking button 10, my analog quick look button 28, and the positioning of the left and right digital buttons 32L and 32R. In one embodiment, a switch mechanism on the game controller is used to change the existing right analog stick 14R from a tilting component to a resistive sliding component similar to the tracking button 10. The player can switch the right analog stick 14R back to a tilting component at any time.

In another embodiment, a track ball with analog properties, slightly bigger in size than one of the four digital face buttons, can be used in place of the tracking button 10 to achieve the same level of precision over the look function.

In yet another embodiment, the analog quick look button 28 could also be placed above the right analog trigger 14R instead of the left analog trigger 14L.

In still another embodiment, a small (relative to the size of the left and right analog sticks 14L and 14R) tilting analog control stick can be used in place of the analog sliding button 28 below the four main digital face buttons 12A, B, C, and D to perform the same head or upper body rotation (looking to the left or the right). The small analog control stick need only tilt left and right to perform its function.

The novel buttons and associated concepts have been described in conjunction with specific games in which a character progresses along a path or a maze. Of course, they are also useful for many other types of games, such as sports related games (including simulated football, baseball, soccer, boxing, wresting, and so on). In each of these games, the inventive buttons can be used to allow a participant to turn an upper body portion and look sideways.

In another embodiment, the left and right digital buttons 32L and 32R could be placed ¾ of an inch down and ½ an inch towards the medial aspect of the game controller so the tips of the game player's middle fingers can press the buttons in their natural position when holding the controller. In contrast, the game player can use the middle phalange section of their middle fingers to press the left and right digital buttons 32L and 32R with my button configuration.

Moreover, there are many alternative ways to design and implement an effective quick look button 28. An alternate analog quick look button 128 may be provided that slides on a quarter circle path from its neutral position to the left & right and returns, unassisted, to its point of origin upon release, as shown in FIG. 11. In other words, the button 128 moves along a crescent or C-shaped track 128T. The full range of the alternate analog quick look button 128 circular path is 180 degrees (half circle) from its farthest left position to its farthest right position and vice versa. When the analog quick look button 128 is in its neutral center position it has a moveable range of 90 degrees (quarter circle) to the left or right; this correlates to the natural upper body movement of the video game character (as exposed to the straight line path to the left & right that's used in the primary filing).

In another embodiment, shown in FIG. 12 two buttons 28L, 28R are provided, each sliding along a straight path. The two quick look buttons (28L & 28R) are normally biased in a back-to-back configuration in their neutral starting positions. The left quick look button 28L moves to the left and back to its starting point when released while the right quick look button 28R would only move to the right and back its starting point when released, causing the character to move its head (or torso) to the left, and back, or right and back, respectively.

In another embodiment, a relatively small button 28S is provided as in FIG. 13. The button 28S could be a filing analog control stick. Tilting button 28S left or right causes the character to move his head (or torso) left or right.

All of the alternatively designed quick look buttons could be used in the original location where I placed the quick look button 28, in front of, above, and on a perpendicular angle to the left analog trigger 30L or below the four main digital face buttons 12A, B, C, & D to perform the same video game character upper body rotation (looking to the left or the right). Further still, the analog quick look button 28 can be placed anywhere on the controller where it will be "instantly accessible" to the player.

FIG. 14 shows the location of a quick look button 28 on a video game controller for an XBOX 360®.

It is clear from the above description that the concept of having a character move its head laterally in an action-type game is best implemented using a video controller with a button dedicated (or at least temporarily assigned during a game) to this purpose, i.e., the analog quick look button 28. However, some users may want to be able to have this ability or functionality even if they do not have the appropriate video controller. An alternative way to obtain the functionality of the analog quick look button 28 in this case, for example, on a standard video game controller is to configure the game and the video controller into a mode in which right and left quick look commands are accepted. That is, the game is configured to accept quick look right or quick look left when controls on the video controllers are used that are normally dedicated to other functions, or if two or more controls are activated simultaneously in a manner that has not been used previously. For example, pressing down one of the many digital action buttons 32L on a video game controller 100 could signal the right analog stick 14R to behave like the analog quick look button 28 when it's tilted left or right. When one specific action button 32L is pressed the right analog stick 14R will only rotate the upper body of the game character left and right while losing its typical functionality of turning the entire body of the game character left and right. The button still allows the game character to look up and down. Of course, other buttons, controls or combination thereof maybe used on an existing controller to implement the quick look function.

None of the aforementioned examples should be construed as limiting the general principle of the invention that includes special functioning of the analog quick look button 28 dependent on the current game environment and/or the actions of the game character within that environment.

I claim:

1. A manual controller providing commands from a user to an electronic device comprising:
   a body having an exterior surface;
   a first selector disposed at a first positioned on said body to be operated by a user with a hand; and
   a second selector disposed at a second position adjacent to said first position, said second position being selected to allow the user to operate said first and second selectors simultaneously with the same hand, said second selector being movable in a predetermined path and being biased to a rest position whereby once the selector is moved along said predetermined path and released, it automatically returns to said rest position; and wherein said second selector further being movable toward and away from said exterior surface to generate respective commands.

2. The controller of claim 1 wherein said second selector includes a button moving along said path.

3. The controller of claim 1 wherein said path is linear.

4. The controller of claim 1 wherein said second selector includes a knob movable along said path and a biasing member biasing said knob to said rest position.

5. The controller of claim 1 wherein said track has two opposed ends and said rest position is defined between said two opposed ends.

6. The controller of claim 4 wherein said biasing member is a spring.

7. A pointing device for selectively controlling display elements on a screen associated with an electronic apparatus by generating commands, said electronic apparatus including a software module having a quick look feature, said pointing device comprising:
   a body with a control surface;
   a first selector mounted on said control surface, said first selector being selectively manipulated by a user, each movement of said first selector dynamically generating respective first commands;
   a second selector mounted on said body and being selectively manipulated by the user simultaneously with said first selector to dynamically generate respective second commands, said second selector moving along a predetermined path defined on said body, said path having a rest position, said second selector including a biasing element, wherein after the second selector is moved away from said rest position and is then released, it is automatically returned to said rest position by said biasing element;
   said second selector generating said second commands for said software module to implement said quick look feature when moved by the preselected user from said rest position, wherein said software module simulates walking of a character in a first direction; and simulates looking by said character in a second direction in response to said second commands while the body of said character is still turned in said first direction.

8. The pointing device of claim 7 wherein said second selector includes a knob traveling along said path.

9. The pointing device of claim 7 further comprising a spring as said biasing element.

10. A manual controller providing commands from a user to an electronic device, said device including a software module having a quick look feature and a screen said manual controller comprising:
    a body having an exterior surface;
    a first selector disposed at a first positioned on said body to be operated by a user with a hand; and
    a second selector disposed at a second position adjacent to said first position, said second position being selected to allow the user to operate said first and second selectors simultaneously with the same hand, said second selector being movable in a predetermined path and being biased to a rest position whereby once the selector is moved along said predetermined path and released, it automatically returns to said rest position;
    said second selector generating commands for said software module to implement said quick look feature when moved by the user from said rest position, wherein said software module simulates walking of a character in a first direction; and simulates looking by said character in a second direction in response to said command while the body of said character is still turned in said first direction.

11. The controller of claim 10 wherein said software module still simulates looking by said character in said second direction after said second selector is released.

12. A manual controller providing commands from a user to an electronic device including a screen and a software module having a quick look feature, said manual controller comprising:
    a body having an exterior surface;
    a first selector disposed at a first positioned on said body to be operated by a user with a hand; and
    a second selector disposed at a second position adjacent to said first position, said second position being selected to allow the user to operate said first and second selectors simultaneously with the same hand, said second selector being movable in a predetermined path and being biased to a rest position whereby once the selector is moved along said predetermined path and released, it automatically returns to said rest position;
    said second selector generating commands for said software module to implement said quick look feature, wherein the actuation of said second selector by the user causes said software module to selectively present one of a first and a second scene on the screen.

13. The pointing device of claim 7 wherein said software module still simulates looking by said character in said second direction after said second selector is released.

14. The pointing device of claim 7, wherein the actuation of said second selector by the user causes said software module to selectively select one of a first and a second scene on the screen.

* * * * *